(12) United States Patent
Welch (10) Patent No.: US 10,208,709 B2
(45) Date of Patent: Feb. 19, 2019

(54) FAN BLADE REMOVAL FEATURE FOR A GAS TURBINE ENGINE

(71) Applicant: United Technologies Corporation, Farmington, CT (US)

(72) Inventor: David A. Welch, Quaker Hill, CT (US)

(73) Assignee: United Technologies Corporation, Farmington, CT (US)

( * ) Notice: Subject to any disclaimer, the term of this patent is extended or adjusted under 35 U.S.C. 154(b) by 347 days.

(21) Appl. No.: 15/091,066

(22) Filed: Apr. 5, 2016

(65) Prior Publication Data

US 2017/0284202 A1   Oct. 5, 2017

(51) Int. Cl.

| | | |
|---|---|---|
| *F01D 5/30* | (2006.01) |
| *F02K 3/06* | (2006.01) |
| *F02C 7/04* | (2006.01) |
| *F04D 29/32* | (2006.01) |
| *F04D 29/64* | (2006.01) |
| *F01D 5/32* | (2006.01) |

(52) U.S. Cl.
CPC .............. *F02K 3/06* (2013.01); *F01D 5/3007* (2013.01); *F02C 7/04* (2013.01); *F04D 29/322* (2013.01); *F04D 29/644* (2013.01); *F01D 5/3023* (2013.01); *F01D 5/3053* (2013.01); *F01D 5/323* (2013.01); *F01D 5/326* (2013.01); *F05D 2220/36* (2013.01); *F05D 2230/70* (2013.01)

(58) Field of Classification Search
CPC ...... F01D 5/3007; F01D 5/323; F01D 5/3015; F01D 5/326; F01D 5/3023; F01D 5/3053; F04D 29/644
See application file for complete search history.

(56) References Cited

U.S. PATENT DOCUMENTS 4,265,595 A * 5/1981 Bucy, Jr. ............... F01D 5/3007
                                                          416/220 R
5,403,156 A    4/1995 Amess et al.
(Continued)

FOREIGN PATENT DOCUMENTS

EP    1382800    1/2004
FR    3034130    9/2016
(Continued)

OTHER PUBLICATIONS

European Search Report for Application No. 17165122.7 dated Aug. 2, 2017.

*Primary Examiner* — Justin Seabe
*Assistant Examiner* — Behnoush Haghighian
(74) *Attorney, Agent, or Firm* — Carlson, Gaskey & Olds, P.C.

(57) ABSTRACT

A gas turbine engine includes a fan forward of a primary flowpath inlet. The fan includes multiple fan blades distributed radially about, and connected to, a hub. A fan nacelle is positioned radially outward of the fan and includes an inner diameter. The inner diameter is sloped relative to an engine axis such that a forward portion of the fan nacelle has a smaller inner diameter than an aft portion of the fan nacelle. A fan blade spacer is disposed between a radially inward facing surface of at least one fan blade and a radially outward facing surface of the hub. The fan blade spacer has a radial thickness at least equal to a slope drop of the fan nacelle.

18 Claims, 6 Drawing Sheets

(56) References Cited

U.S. PATENT DOCUMENTS

| | | | |
|---|---|---|---|
| 7,806,662 B2 * | 10/2010 | Gekht | F01D 5/323 416/221 |
| 7,824,157 B2 * | 11/2010 | Buisson | F01D 5/3015 416/220 R |
| 8,459,035 B2 | 6/2013 | Smith et al. | |
| 8,726,632 B2 | 5/2014 | Morford et al. | |
| 2004/0013528 A1 * | 1/2004 | Leathart | F01D 5/323 416/220 R |
| 2013/0192266 A1 | 8/2013 | Houston et al. | |
| 2013/0195645 A1 | 8/2013 | Suciu et al. | |
| 2014/0219807 A1 | 8/2014 | Lattanzio et al. | |
| 2015/0044028 A1 | 2/2015 | Lord et al. | |
| 2015/0176417 A1 * | 6/2015 | Zelmer | F01D 5/3007 416/221 |
| 2015/0226231 A1 * | 8/2015 | Murdock | F04D 29/403 60/726 |
| 2017/0114799 A1 * | 4/2017 | Chanez | B64D 27/16 |

FOREIGN PATENT DOCUMENTS

| | | |
|---|---|---|
| WO | 20140100081 | 6/2014 |
| WO | 20140137685 | 9/2014 |

\* cited by examiner

FAN BLADE REMOVAL FEATURE FOR A GAS TURBINE ENGINE

TECHNICAL FIELD

The present disclosure relates generally to gas turbine engines, and more specifically to a fan blade removal feature for a gas turbine engine.

BACKGROUND

Gas turbine engines include a compressor section that compresses air, a combustor section that mixes the compressed air with a fuel and ignites the mixture, and a turbine section across which the resultant combustion products are expanded. The expansion of the combustion products across the turbine section drives rotation of the turbine, which in turn drives rotation of the compressor through one or more shafts. In some engines, a fan is positioned fore of a compressor inlet, and is driven to rotate by the turbine as well.

In order to analyze and maintain the fan and/or components near the fan within the gas turbine engine, the fan blades are configured such that they can be disconnected from the engine and removed without requiring the gas turbine engine to be disconnected from the wing or fully disassembled. In a conventional gas turbine engine, once disconnected from the engine, the fan blades are slid axially forward relative to an engine axis, thereby removing the blade from the engine and granting access to the blade and the surrounding components.

SUMMARY OF THE INVENTION

In one exemplary embodiment a gas turbine engine includes a fan forward of a primary flowpath inlet, the fan including a plurality of fan blades distributed radially about, and connected to, a hub, a fan nacelle positioned radially outward of the fan and including an inner diameter, the inner diameter being sloped relative to an engine axis such that a forward portion of the fan nacelle has a smaller inner diameter than an aft portion of the fan nacelle, and a fan blade spacer disposed between a radially inward facing surface of at least one fan blade and a radially outward facing surface of the hub, the fan blade spacer having a radial thickness at least equal to a slope drop of the fan nacelle.

In another exemplary embodiment of the above described gas turbine engine, the spacer has a first radial thickness at a fore edge of the spacer and a second radial thickness at an aft edge of the spacer, and wherein the first radial thickness is distinct from the second radial thickness.

In another exemplary embodiment of any of the above described gas turbine engines, the first radial thickness is greater than the second radial thickness.

In another exemplary embodiment of any of the above described gas turbine engines, the radially outward surface of the hub has a first radius at a fore edge of the hub, a second radius at the aft edge of the hub, and wherein the first radius is less than the second radius.

In another exemplary embodiment of any of the above described gas turbine engines, the fan blade spacer includes a conical center hole.

In another exemplary embodiment of any of the above described gas turbine engines, a slope of a radially outward facing surface of the hub is greater than or equal to a slope of a radially inward facing surface of a fan nacelle.

In another exemplary embodiment of any of the above described gas turbine engines, the slope of the radially outward facing surface of the hub is approximately equal to the slope of the radially inward facing surface of the fan nacelle.

In another exemplary embodiment of any of the above described gas turbine engines, the fan blade spacer includes a center hole.

In another exemplary embodiment of any of the above described gas turbine engines, the blade spacer is a segmented ring.

In another exemplary embodiment of any of the above described gas turbine engines, the blade spacer is a single component.

An exemplary method for removing a fan blade from an aircraft engine includes at least partially removing a fan blade spacer, shifting a fan blade radially inward, at least a distance equal to a slope drop of a fan nacelle, and sliding the fan blade axially forward.

In another example of the above described exemplary method for removing a fan blade from an aircraft engine shifting the fan blade radially inward further includes shifting a forward edge of the fan blade further radially inward than an aft edge of the fan blade.

In another example of any of the above described exemplary methods for removing a fan blade from an aircraft engine shifting the fan blade further includes shifting the fan blade such that a slope of a fan blade tip is at least a slope of an inner diameter of the fan nacelle.

In another example of any of the above described exemplary methods for removing a fan blade from an aircraft engine shifting the fan blade further includes shifting the fan blade such that a slope of a fan blade tip is approximately equal to a slope of an inner diameter of the fan nacelle.

In another example of any of the above described exemplary methods for removing a fan blade from an aircraft engine removing the fan blade spacer further includes removing a fan blade lock.

In another example of any of the above described exemplary methods for removing a fan blade from an aircraft engine the slope drop of the fan nacelle is defined as a radial increase of an inner diameter of the fan nacelle from an inlet to a leading edge of at least one fan blade.

In another example of any of the above described exemplary methods for removing a fan blade from an aircraft engine the at least partially removing a fan blade spacer comprises removing a segment of the fan blade spacer, the removed segment being radially inward of the fan blade.

In another example of any of the above described exemplary methods for removing a fan blade from an aircraft engine the at least partially removing a fan blade spacer comprises removing a full ring fan blade spacer.

In one exemplary embodiment a fan blade spacer for a gas turbine engine includes a ring shaped body including a center hole, the center hole protruding axially through the ring shaped body.

In another exemplary embodiment of the above described fan blade spacer for a gas turbine engine the center hole is one of a cylindrical hole having a constant diameter and a conical hole having an increasing diameter from a first axial end of the ring shaped body to a second axial end of the ring shaped body opposite the first axial end of the ring shaped body.

These and other features of the present invention can be best understood from the following specification and drawings, the following of which is a brief description.

DETAILED DESCRIPTION OF AN EMBODIMENT

Figure 1:
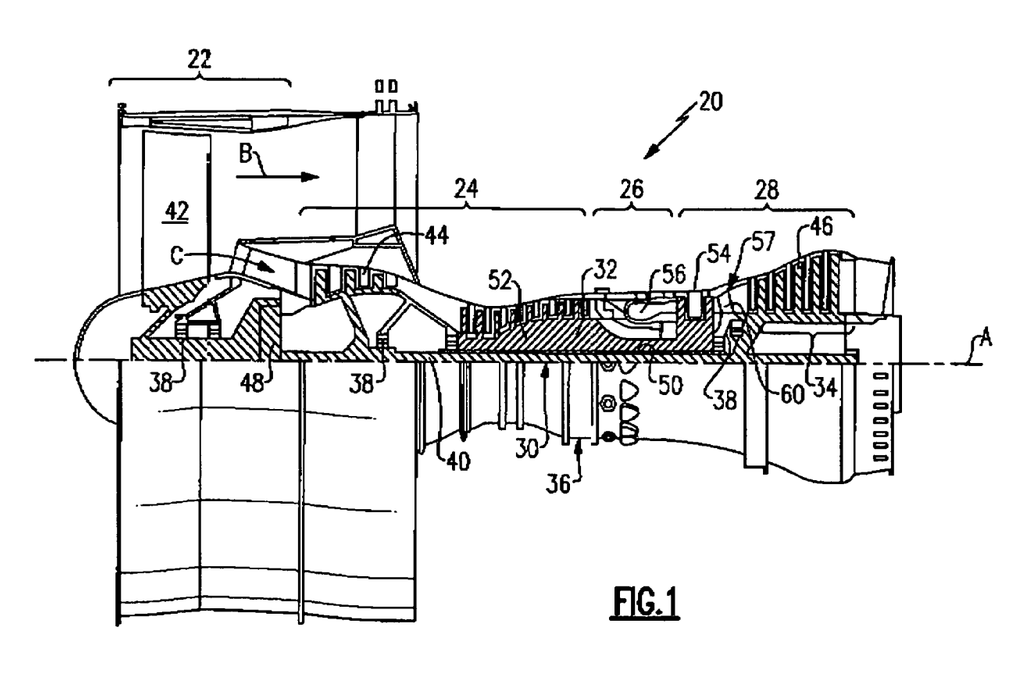
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (1066.8 meters). The flight condition of 0.8 Mach and 35,000 ft (1066.8 m), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/s).

Figure 2:
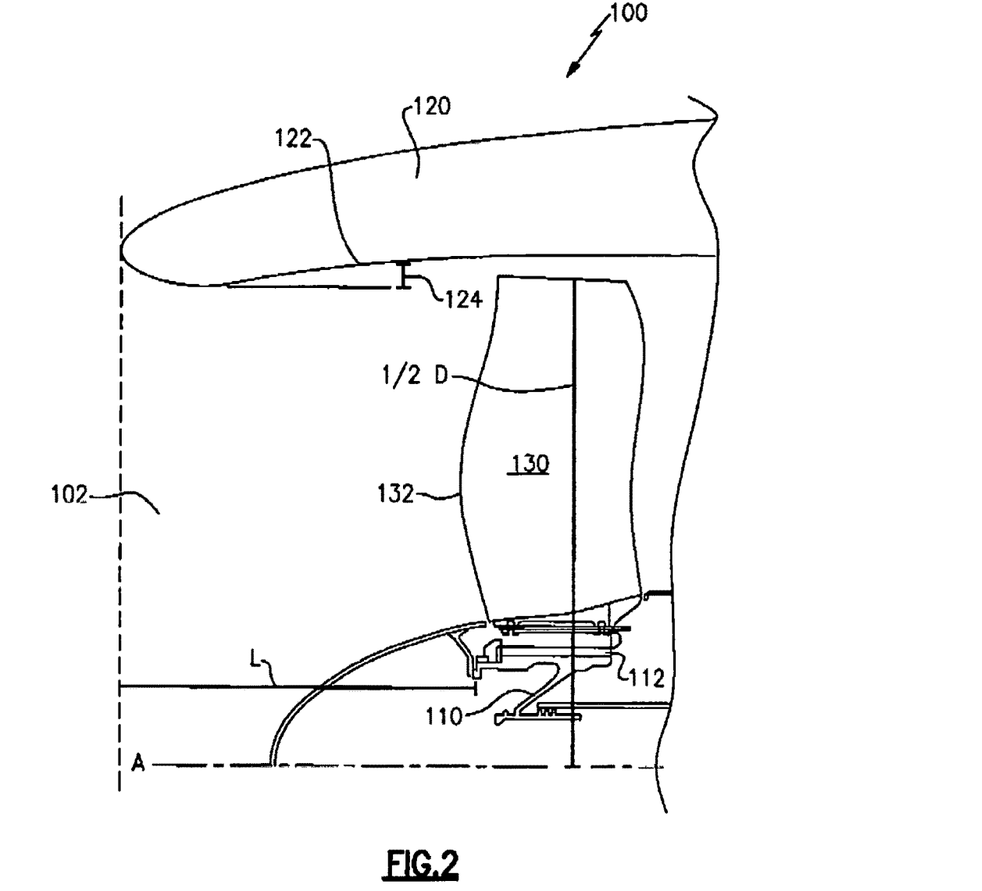
FIG. 2 schematically illustrates a fan section of an example gas turbine engine.

FIG. 2 schematically illustrates a fan section 100 of an example gas turbine engine. The exemplary fan section 100 is a short inlet low pressure ratio fan section. A diameter of the fan has a dimension D that is based on a dimension of the fan blades 130. Each fan blade 130 has a leading edge 132. An inlet 102 is situated forward of the fan. A length of the inlet 102 has a dimension L between a location of the leading edge 132 of at least some of the fan blades 130 and a forward edge of the inlet 102. A dimensional relationship of L/D is between about 0.2 and 0.45. In a further example, the engine has a high bypass ratio and the fan is a low pressure ratio fan having a pressure ratio between about 1.20 and about 1.50 at its cruise design point.

The fan section includes a radially inward fan hub 110, and a radially outward fan nacelle 120. Connected to the fan hub 110 are multiple fan blades 130 that form the fan. The fan nacelle 120 includes a radially inward facing surface referred to as the inner diameter 122. In order to facilitate the short inlet structure, the inner diameter 122 is sloped axially, relative to an axis A defined by the gas turbine engine. As a result of the slope, the inner diameter 122 of the fan nacelle 120 at the inlet 102 is less than the inner diameter 122 of the fan nacelle 120 at the fan blades.

In a typical maintenance operation, the fan blades 130 are removed by disconnecting the fan blade 130 at the hub 110, and sliding the fan blade 130 axially forward. However, due to the slope of the inner diameter 122 of the fan nacelle 120, sliding the fan blade 130 axially would cause the fan blade to contact the inner diameter 122 of the fan nacelle 120, and the fan blade 130 cannot be removed in this manner.

In order to decrease the radial height of the fan blade 130, some fan hubs 110 include a spacer positioned between the root of the fan blade and a radially outward facing surface of the fan hub. The radially outward facing surface of the fan hub is, in some examples, referred to as the live rim. By removing the spacer 112 prior to removing the fan blade 130, the fan blade 130 can be shifted radially inward, allowing for additional clearance at the radially outward tip of the fan blade 130. In some examples, a radial thickness of the spacer 112 is at least equal to a slope drop 124 of the inner diameter 122 of the fan nacelle 120. The slope drop 124 is defined as the radial increase of the inner diameter 122 from the inlet 102 to a leading edge of at least one fan blade 130. Utilizing a spacer 112 with a radial thickness that is at least equal to the slope drop 124, allows the fan blade 130 to be shifted a sufficient radial distance such that the tip of the fan blade 130 clears the narrowest portion of the inlet 102 and allows the fan blade 130 to be removed.

Figure 3:
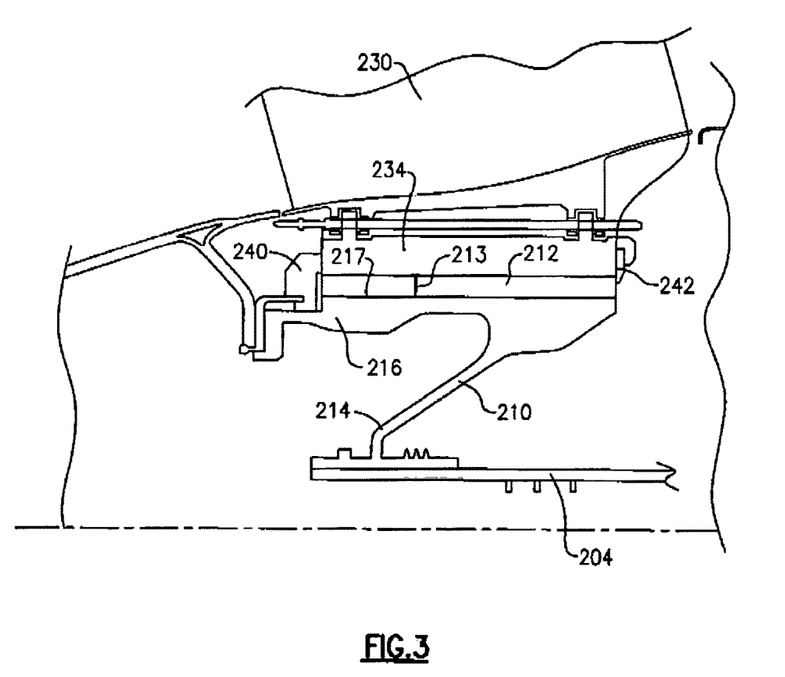
FIG. 3 schematically illustrates a fan hub connection of a fan blade in an example gas turbine engine.

With continued reference to FIG. 2, and with like numerals indicating like elements, FIG. 3 schematically illustrates a hub connection of a fan blade 230 in an example gas turbine engine. A hub structure 210 includes a radially inward arm 214 that connects the hub structure 210 to a shaft 204. The shaft 204 provides rotational forces to the hub 210, which in turn drives rotation of the fan. In geared turbofan examples, the shaft 204 or the arm 214 is connected to a gear system, which in turn receives rotational power from a turbine shaft.

A radially outward portion of the hub 210 includes a hub platform 216 having a radially outward facing surface 217. The radially outward facing surface 217 is, in some examples, referred to as the live rim. Disposed radially outward of, and contacting, the hub platform 216 is a spacer 212. The spacer 212 has a radial thickness 213. The radial thickness 213 is at least equal to the slope drop 124 (illustrated in FIG. 2). Radially outward of, and contacting, the spacer 212 is a blade root 234. The blade root 234 can be any style blade root and connects the fan blade 230 to the rotor hub 210.

Forward of the blade root 234 and of the spacer 212 is a fan blade lock 240. The fan blade lock 240 ensures that the spacer is maintained in position during operation of the gas turbine engine, and prevents removal of the spacer 212 as long as the fan blade lock 240 is in place. In some examples, a second fan blade lock 242 is positioned aft of the blade root 234 and the spacer 212. The second fan blade lock 242 serves a similar function.

In order to remove the fan blade 230 for maintenance, a technician removes the fan blade lock 240 and slides the spacer 212 out from between the blade root 234 and the hub platform 216. This allows the blade 230 to shift radially inward, and facilitate axial removal. As the thickness of the spacer 212 is at least as large as the slop drop 124, the tip of the fan blade 230 is lowered a sufficient distance that no contact between the tip of the fan blade 230 and the inner diameter 122 (see FIG. 2) of the fan nacelle 120 occurs during the blade removal process.

Figure 4A:
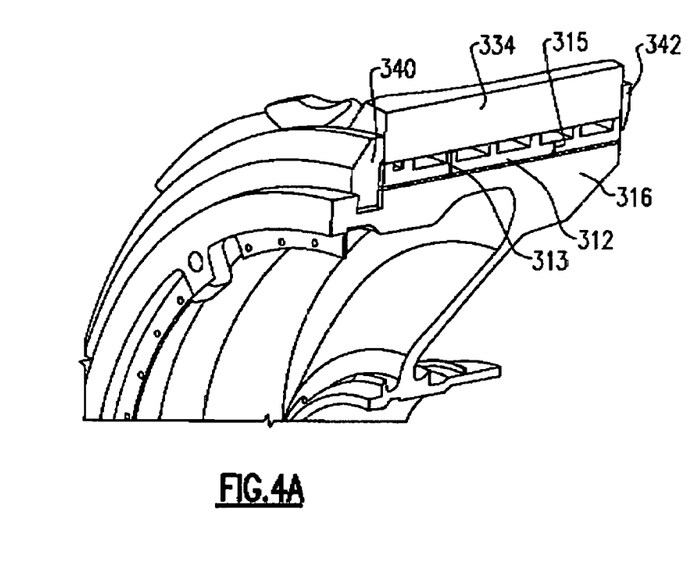
FIG. 4A schematically illustrates a sectional isometric view of an example fan blade hub connection feature.
Figure 4B:
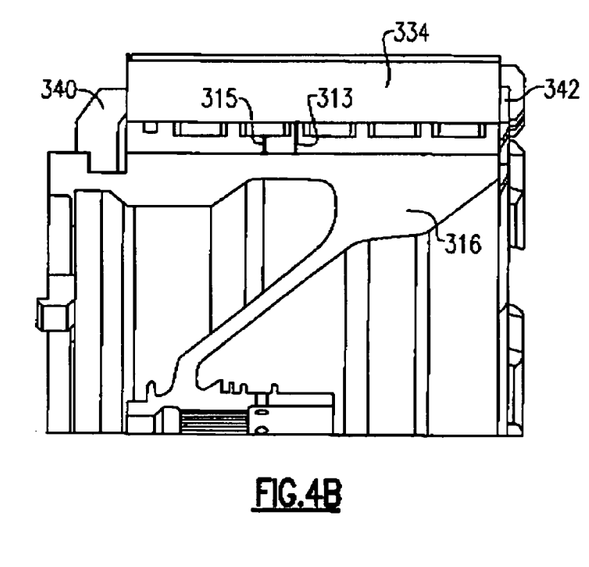
FIG. 4B schematically illustrates a cross sectional view of the fan blade hub connection feature of FIG. 4A.

With continued reference to FIGS. 2 and 3, and with like numerals indicating like elements, FIGS. 4A and 4B illustrate a three dimensional view of a fan blade connection in an isometric view (FIG. 4A) and a cross sectional view (FIG. 4B). As with the example of FIG. 3, a fan blade root 334 contacts a spacer 312 which in turn contacts a hub platform 316. The spacer 312 is maintained in position via a forward blade lock 340 and an aft blade lock 342. The spacer 312 of FIGS. 4A and 4B has a first thickness 313 equal to or greater than the slope drop 124 of the engine in which the fan is incorporated.

A second thickness 315 is included at portions of the spacer 312. The second thickness 315 is shorter than the first thickness 313, and allows for less material to be utilized in creating the spacer 312. The reduced material, in turn, reduces the weight of the spacer 312. One of skill in the art, having the benefit of this disclosure can determine appropriate configurations for the varied thicknesses 313, 315 in order to ensure proper strength and stability of the spacer 312.

In the examples of FIG. 3 and FIGS. 4A and 4B, the spacer 212, 312 is cylindrical in nature and includes a cylindrical center hole having a constant diameter. The spacer 312 can, in one example, be an entire ring of a single component that is slid into position during assembly. In another example, the spacer 312 can be multiple distinct segments that combine to form a cylindrical shape.

Figure 5A:
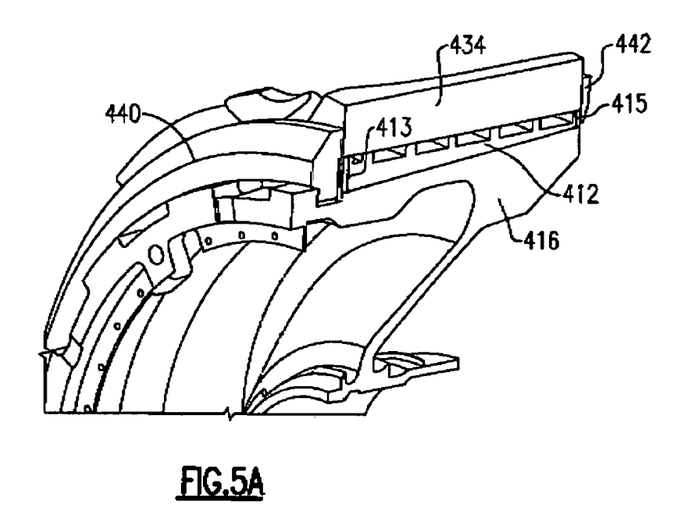
FIG. 5A schematically illustrates a sectional isometric view of an example fan blade hub connection feature.
Figure 5B:
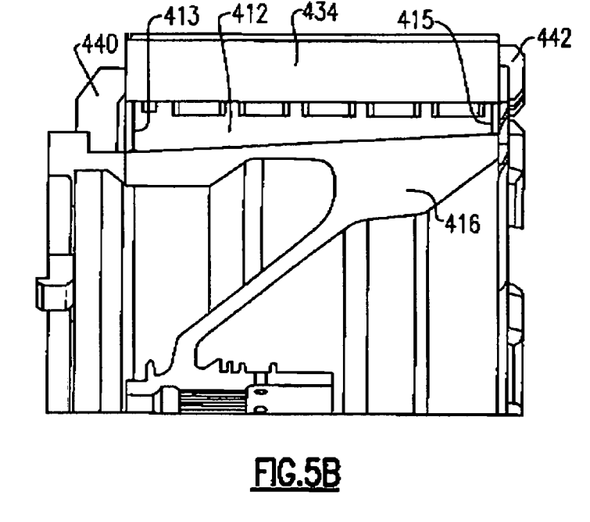
FIG. 5B schematically illustrates a cross sectional view of the fan blade hub connection feature of FIG. 5A.

With continued reference to FIGS. 2-4B, and with like numerals indicating like elements, FIGS. 5A and 5B illustrate an alternative example three dimensional view of a fan blade connection in an isometric view (FIG. 5A) and a cross sectional view (FIG. 5B). A fan blade root 434 contacts a spacer 412 which in turn contacts a hub platform 416. The spacer 412 is maintained in position via a forward blade lock 440 and an aft blade lock 442. The spacer 412 has a first thickness 413 and a second thickness 415. The first thickness 413 is at a forward edge of the spacer 412, and is larger than the second thickness 415 at the aft edge of the spacer 412.

The radially outward facing surface of the rotor hub 416 is sloped with an axial slope that is at least complimentary to the axial slope of the corresponding inner diameter 122 of the fan nacelle 120. Similarly sloped is the center hole of the spacer 412. Due to the sloped nature of the center hole, the center hole is conical, with an increasing diameter. Unlike the examples of FIGS. 4A and 4B, when the spacer 412 is removed, the blade root 434, and the corresponding fan blade shifts radially inward and rotates axially to an angled position. As a result of the angled position, with the forward edge of the blade root 434 being closer to an engine axis than the aft edge, the tip of the fan blade is also angled. The angle matches the angle of the inner diameter 122 of the fan nacelle 120.

As the angle of the blade tip matches the angle of the inner diameter 122 of the fan nacelle 120, the fan blade can be axially removed from the fan assembly, while requiring less radial shifting of the blade than in the example of FIGS. 4A and 4B.

Figure 6:
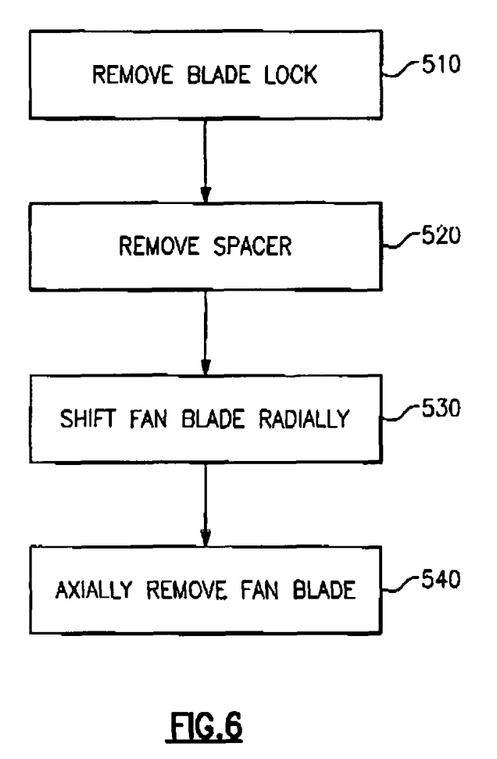
FIG. 6 illustrates an example method for removing a fan blade from a gas turbine engine.

With continued reference to FIGS. 2-5B, FIG. 6 illustrates an exemplary method of servicing a gas turbine engine having a short inlet, such as the gas turbine engines described above with regards to FIGS. 2-5B. Initially, a technician opens the engine and removes the blade lock in a "Remove Blade Lock" step 510. Once the blade lock has been removed, the technician removes the spacer positioned between the rotor blade root and a rotor hub in a "Remove Spacer" step 520. The gap where the spacer was previously positioned allows the blade to be shifted radially inward in a "Shift Fan Blade Radially" step 530.

In some examples, such as with a cylindrical spacer, the fan blade is shifted directly radially. In alternative examples, such as with a conical spacer, the fan blade is shifted radially and partially rotated forward. The forward rotation tilts the angle of the fan blade tip such that the fan blade tip angle approximately matches the slope angle of the inner diameter of the fan nacelle.

Once shifted radially, the fan blade is slide axially forward and removed from the gas turbine engine in an "Axially Remove Fan Blade" step 540. The fan blade itself can then be examined, or components in and around the fan hub can be maintained. One of skill in the art will understand that to reinstall the fan blade, or replace the fan blade with a new fan blade, the above described steps are reversed.

While described herein in relation to a short inlet low pressure ratio gas turbine engine, one of skill in the art, having the benefit of this disclosure, will understand that the above described principles and constructions can apply to any gas turbine engine including an angled inner diameter surface of a fan nacelle and that the principles and constructions are, therefore, not limited to a short inlet low pressure ratio gas turbine engine.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
    a fan forward of a primary flowpath inlet;
    the fan including a plurality of fan blades distributed radially about, and connected to, a hub;
    a fan nacelle positioned radially outward of the fan and including an inner diameter, the inner diameter being sloped relative to an engine axis such that a forward portion of the fan nacelle has a smaller inner diameter than an aft portion of the fan nacelle; and
    a ring shaped fan blade spacer including a center hole coaxial with an axis defined by the ring shaped fan blade spacer, the ring shaped fan blade spacer being disposed between a radially inward facing surface of at least one fan blade and a radially outward facing surface of said hub, the fan blade spacer having a radial thickness at least equal to a slope drop of the fan nacelle.

2. The gas turbine engine of claim 1, wherein the spacer has a first radial thickness at a fore edge of the spacer and a second radial thickness at an aft edge of the spacer, and wherein the first radial thickness is distinct from the second radial thickness.

3. The gas turbine engine of claim 2, wherein the first radial thickness is greater than the second radial thickness.

4. The gas turbine engine of claim 1, wherein the radially outward surface of the hub has a first radius at a fore edge of the hub, a second radius at the aft edge of the hub, and wherein the first radius is less than the second radius.

5. The gas turbine engine of claim 4, wherein the fan blade spacer includes a conical center hole, the center hole being coaxial with an axis defined by the fan blade spacer.

6. The gas turbine engine of claim 4, wherein a slope of a radially outward facing surface of the hub is greater than or equal to a slope of a radially inward facing surface of a fan nacelle.

7. The gas turbine engine of claim 6, wherein the slope of the radially outward facing surface of the hub is equal to the slope of the radially inward facing surface of the fan nacelle.

8. The gas turbine engine of claim 1, wherein the ring shaped fan blade spacer is a segmented ring.

9. The gas turbine engine of claim 1, wherein the ring shaped fan blade spacer is a single component.

10. A method for removing a fan blade from an aircraft engine comprising:
    at least partially removing a ring shaped tan blade spacer, wherein the ring shaped fan blade spacer includes center hole coaxial with an axis defined by the ring shaped fan blade spacer;
    shifting a fan blade radially inward, at least a distance equal to a slope drop of a fan nacelle; and
    sliding said fan blade axially forward.

11. The method of claim 10, wherein shifting the fan blade radially inward further includes shifting a forward edge of the fan blade further radially inward than an aft edge of the fan blade.

12. The method of claim 11, wherein shifting the fan blade radially inward further includes shifting the fan blade such that a slope of a fan blade tip is at least a slope of an inner diameter of the fan nacelle.

13. The method of claim 12, wherein shifting the fan blade radially inward further includes shifting the fan blade such that a slope of a fan blade tip is equal to a slope of an inner diameter of the fan nacelle.

14. The method of claim 10, wherein at least partially removing the fan blade spacer further includes removing a fan blade lock.

15. The method of claim 10, wherein at least partially removing the fan blade spacer comprises removing a segment of the fan blade spacer, the removed segment being radially inward of the fan blade.

16. The method of claim 10, wherein at least partially removing the fan blade spacer comprises removing a full ring fan blade spacer.

17. A fan blade spacer for a gas turbine engine comprising:
    a ring shaped body including a center hole, coaxial with an axis defined by the fan blade spacer, the center hole protruding axially through the ring shaped body.

18. The fan blade spacer of claim 17, wherein the center hole is one of a cylindrical hole having a constant diameter and a conical hole having an increasing diameter from a first axial end of the ring shaped body to a second axial end of the ring shaped body opposite the first axial end of the ring shaped body.

* * * * *